(12) United States Patent
Messink et al.

(10) Patent No.: US 12,529,419 B2
(45) Date of Patent: Jan. 20, 2026

(54) TRANSMISSION HOUSING WITH DRILLED OIL PAN

(71) Applicant: Flender Industriegetriebe GmbH, Penig (DE)

(72) Inventors: Christoph Messink, Penig (DE); Guido Josten, Penig (DE)

(73) Assignee: Flender Industriegetriebe GmbH, Penig (DE)

( * ) Notice: Subject to any disclaimer, the term of this patent is extended or adjusted under 35 U.S.C. 154(b) by 0 days.

(21) Appl. No.: 18/841,627

(22) PCT Filed: Feb. 6, 2023

(86) PCT No.: PCT/EP2023/052777
§ 371 (c)(1),
(2) Date: Aug. 26, 2024

(87) PCT Pub. No.: WO2023/165781
PCT Pub. Date: Sep. 7, 2023

(65) Prior Publication Data
US 2025/0164002 A1    May 22, 2025

(30) Foreign Application Priority Data
Mar. 1, 2022    (EP) .................................. 22159442

(51) Int. Cl.
*F16H 57/04*    (2010.01)
*F16H 57/03*    (2012.01)

(52) U.S. Cl.
CPC ......... *F16H 57/0424* (2013.01); *F16H 57/03* (2013.01); *B23P 2700/00* (2013.01); *F16H 57/0471* (2013.01)

(58) Field of Classification Search
CPC ...... F16H 57/03; F16H 57/031; F16H 57/042; F16H 57/0424; F16H 57/0452; F16H 57/0471; B23P 2700/00
See application file for complete search history.

(56) References Cited

U.S. PATENT DOCUMENTS 1,746,599 A * 2/1930 Mahan .................. F16H 57/025
74/606 R
2,270,980 A * 1/1942 Tidball .................... F16H 57/03
74/606 R (Continued)

FOREIGN PATENT DOCUMENTS

| CN | 103185125 A | * | 7/2013 | ........... F16H 57/021 |
| CN | 103953722 A | * | 7/2014 | ........... F16H 57/031 |

(Continued)

OTHER PUBLICATIONS

International Search Report issued on Apr. 6, 2023 by the European Patent Office in International Application PCT/EP2023/052777.

*Primary Examiner* — Adam D Rogers
(74) *Attorney, Agent, or Firm* — Henry M. Feiereisen LLC

(57) ABSTRACT

A transmission housing includes a plurality of side walls, at least one of the side walls including one or more housing openings for accommodating a bearing. A rib structure is formed on an inner side of one of the side walls and designed to taper in a funnel shape vertically above one of the housing openings in a direction of the one of the housing openings. A collecting pan is formed by a drill hole traversing the one of the side walls, with the rib structure opening into the collecting pan.

18 Claims, 5 Drawing Sheets

(56) References Cited

U.S. PATENT DOCUMENTS

| | | | |
|---|---|---|---|
| 3,029,661 A * | 4/1962 | Schmitter | F16H 1/22 |
| | | | 184/6.12 |
| 3,785,458 A | 1/1974 | Caldwell et al. | |
| 4,221,279 A * | 9/1980 | Jones | F16C 33/6659 |
| | | | 184/6.12 |
| 4,359,142 A * | 11/1982 | Schultz | F16H 57/0427 |
| | | | 184/6.12 |
| 4,359,909 A | 11/1982 | Sogo | |
| 7,484,893 B2 * | 2/2009 | Kitaoka | F16H 57/043 |
| | | | 384/473 |
| 9,309,959 B2 * | 4/2016 | Ishikawa | F16H 57/027 |
| 12,146,565 B2 * | 11/2024 | Wu | F16H 57/021 |
| 2016/0290479 A1 | 10/2016 | Wu | |
| 2017/0261093 A1* | 9/2017 | Yamamoto | F16H 57/0424 |

FOREIGN PATENT DOCUMENTS

| | | | | |
|---|---|---|---|---|
| CN | 104048022 | | 9/2014 | |
| CN | 112065875 | | 12/2020 | |
| DE | 10 2013 018 712 | | 5/2015 | |
| DE | 102017130270 | | 6/2019 | |
| DE | 10 2021 002 928 | | 1/2022 | |
| EP | 3 499 091 | | 6/2019 | |
| GB | 2166816 A * | | 5/1986 | F16H 57/0423 |
| JP | S 49-19261 A | | 2/1974 | |
| JP | S 56-146159 U | | 11/1981 | |

\* cited by examiner

TRANSMISSION HOUSING WITH DRILLED OIL PAN

CROSS-REFERENCES TO RELATED APPLICATIONS

This application is the U.S. National Stage of International Application No. PCT/EP2023/052777, filed Feb. 6, 2023, which designated the United States and has been published as International Publication No. WO 2023/165781 A1 and which claims the priority of European Patent Application, Serial No. 22159442.7, filed Mar. 1, 2022, pursuant to 35 U.S.C. 119(a)-(d).

BACKGROUND OF THE INVENTION

The invention relates to a transmission housing with at least a plurality of side walls, wherein at least one of the side walls has one or more housing openings for accommodating a bearing, and wherein a rib structure which tapers in a funnel shape vertically above a housing opening in the direction of the housing opening is formed on an inner side of one side wall. Splash oil or lubricating oil is collected via the rib structure in order to feed it, for example, to a bearing of transmission components accommodated in the transmission housing.

Splash oil or lubricating oll is caught and guided fluidically inside a transmission housing generally via oil guidance ribs and/or oil receiving pockets which are cast in a relatively complex fashion. The oil guidance ribs serve primarily for the described oil guidance and not for any kind of stiffening or reinforcement of the housing structure per se. There is a constant need to improve transmission housings in terms of the catching and fluidical guidance of splash oil or lubricating oil and hereby to Incorporate the aspect of stiffening and reinforcement of the transmission structure. CN 104048022 B shows a transmission housing with a U-shaped rib structure on the lower flank on which an undercut is produced using casting technology such that a collecting pan is formed. So that the oil which collects there can flow to the bearing, a hole is drilled from the bearing seat vertically upward such that the drill hole can communicate with the collecting pan. U.S. Pat. No. 3,785,458 discloses oiling of a bearing via a bearing cover and an oil drill hole.

The object of the invention is to demonstrate measures which enable an improvement in the catching and guidance of splash oll or lubricating oil from the perspective of stiffening and reinforcing the housing structure.

SUMMARY OF THE INVENTION

The object is achieved by a transmission housing as set forth hereinafter. Preferred embodiments are specified in the dependent claims and the description below which in each case can constitute an aspect of the invention individually or in combination. If a feature is Illustrated in combination with another feature, this serves only to simplify the presentation of the Invention and is in no way Intended to mean that this feature cannot also be a development of the invention without the other feature.

One embodiment relates to a transmission housing comprising a plurality of side walls, wherein at least one of the side walls has one or more housing openings for accommodating a bearing, wherein a rib structure which tapers in a funnel shape vertically above a housing opening in the direction of the housing opening is formed on an inner side of one side wall, wherein a collecting pan is provided into which the rib structure which tapers in a funnel shape opens and which is formed by a drill hole traversing the side wall.

In an operating situation which can regularly be expected, the side walls are oriented perpendicularly or vertically. This means that a perpendicular direction from the plane of the housing openings of the side walls is a horizontal direction. Two side walls situated horizontally opposite each other can be provided with rib structures which taper in a funnel shape above a respective housing opening in the direction of the housing opening. The side walls can stand on a housing base. Housing feet can be provided which are essentially formed by the housing base but can also be drawn into the side walls.

Spur gears and/or bevel spur gears can be accommodated in the transmission housing via corresponding shafts. The shafts can be mounted rotatably via bearings accommodated in the housing openings. The housing openings are expediently configured as round drill holes. Rolling bearings can, for example, be used as the bearings.

The transmission housing can in some regions or predominantly be configured with thin walls, wherein the loss of stiffness which occurs as a result is at least compensated by the rib structure on the inner sides of the side walls. A further rib structure or ribbing can also be provided which contributes to the stiffness of the transmission housing.

The rib structure is formed by a protrusion rising from a main surface. In a simple embodiment, it can be provided that the rib structure is formed just by two ribs which taper vertically downward toward each other. The rib structure which tapers in a funnel shape can furthermore also be referred to as V-shaped. It is not absolutely necessary here that the V shape runs vertically downward to a tip. It can also be provided that the lower region of the rib structure extends in a rounded form. Even a U shape would be conceivable for certain applications. Targeted catching of the splash oil and routing of the oil caught to the bearing locations is possible via the rib structure.

The collecting pan is open essentially vertically upward. A surface of the collecting pan can have the same surface finish as a surface of the drill hole inside the side wall. The surface finish of the collecting pan and the drill hole preferably has a considerably lower surface roughness than the adjacent rib structure and the inner face of the side wall. Via the collecting pan and the drill hole traversing the side wall, it is possible to collect the caught lubricating oil outside the side wall and to feed it in a targeted fashion to the bearing arranged there from outside.

It can in particular be provided that the drill hole forms the collecting pan with a portion situated on the inner side of the side wall. This means that the collecting pan is a part of the drill hole. The collecting pan is preferably delimited vertically downward at least partially by the rib structure not included by the drill hole. As a result, there is no need for an undercut to be provided by casting technology because the undercut required for the collecting pan is produced by the drill hole which leaves the rib structure untouched in a region vertically below the drill hole and in an axial extension thereof.

In a preferred embodiment, it is provided that the drill hole traverses the side wall in a direction perpendicular to a main plane of the side wall. This Is particularly advantageous in terms of manufacturing technology because further drill holes, for example for screw holes, are also made perpendicularly to the wall. In this respect, the same tool can be used in the present case.

In a preferred embodiment, it is provided that the collecting pan has an undercut, considered from a direction perpendicular to the side wall. As a result, the caught oil is prevented at least as far as possible from overflowing into the interior of the transmission housing.

In a preferred embodiment, it is provided that a vertical depth of the collecting pan is between $\frac{1}{3}$ and $\frac{2}{3}$ of the diameter of the drill hole. As a result, it is advantageously ensured that the drill hole can be made through the side wall within certain tolerances. It is particularly preferred if the vertical depth is between $\frac{2}{5}$ and $\frac{3}{5}$ of the diameter. From a functional point of view, it is in particular preferred if the vertical depth of the collecting pan is half the diameter of the drill hole.

In an additional preferred embodiment, it is provided that the housing opening and the drill hole are covered by a housing side cover. A supplementary volume is here formed by the housing side cover with respect to the actual housing volume. This supplementary volume can be used to store oil before the oil can flow away again through the bearing in order to lubricate and cool the bearing in this way.

The transmission housing has a mounting cover with an inner wall which, in a preferred embodiment, is bulged outward starting from an internal volume of the transmission housing. It is advantageously ensured here that lubricating oil splashed onto the inner wall of the mounting cover flows off in the direction of one of the side walls in order to be caught there on the side walls of the funnel-shaped rib structure. It is in particular provided that the bulge of the inner wall extends within a vertical plane of section extending perpendicular to the side wall.

The object is moreover achieved by a method for producing one of the described embodiments of a transmission housing, in which the rib structure which tapers in a funnel shape is cast, via a casting process, with no undercuts on an inner side of a side wall, considered from a direction perpendicular to the side wall, and the collecting pan is produced by making the drill hole in the side wall in a vertically lower region of the rib structure. It is advantageous that the rib structure is cast with no undercuts on the inner side of the side wall in the method. This facilitates and simplifies the casting process because there is no need for undercut-forming casting cores and the latter no longer need to be subsequently knocked out of the undercuts.

In a preferred embodiment of the method, the drill hole is made inward from an outer side of the side wall, wherein the center of the drill hole lies at the vertical height of a foot of the rib structure. In the present case, the center means the center axis of the drill hole. The foot of the rib structure is formed by the transition from the vertical side wall to the bulge forming the rib structure. The transition expediently lies at the vertically lowest point. The drill hole is thus made with its center axis in such a way that the center axis lies essentially in this foot or transition between the side wall and rib structure and extends essentially by half the diameter of the drill hole further in the rib structure and extends vertically above the rib structure, and thus clear of the rib structure, by half the diameter of the drill hole. The apportionment of what proportion of the drill hole diameter extends in the rib structure and what corresponding complementary proportion extends clear of the rib structure can diverge from the equal division as has already been described above.

The object is moreover achieved by an industrial application comprising a drive means which is connected in a torque-transmitting fashion to a transmission, wherein the transmission is coupled in a torque-transmitting fashion to a mechanical application, wherein the transmission is formed with an abovedescribed transmission housing.

In addition, the object is achieved by a data agglomeration with data packets which are combined in a common file or are distributed over different files in order to represent the three-dimensional design and/or the interactions of a transmission with a transmission housing as described above, wherein the data packets are prepared so as to, when processed by a data processing device, implement the production of the transmission housing, in particular by 3D printing by means of a 3D printer, and/or a simulation of the operating mode of the transmission housing.

BRIEF DESCRIPTION OF THE DRAWING

The invention will be explained by way of example below with reference to the attached drawings on the basis of preferred exemplary embodiments, wherein the features presented below can constitute an aspect of the invention both in each case individually and in combination. In the drawings.

DETAILED DESCRIPTION OF PREFERRED EMBODIMENTS

Figure 1:
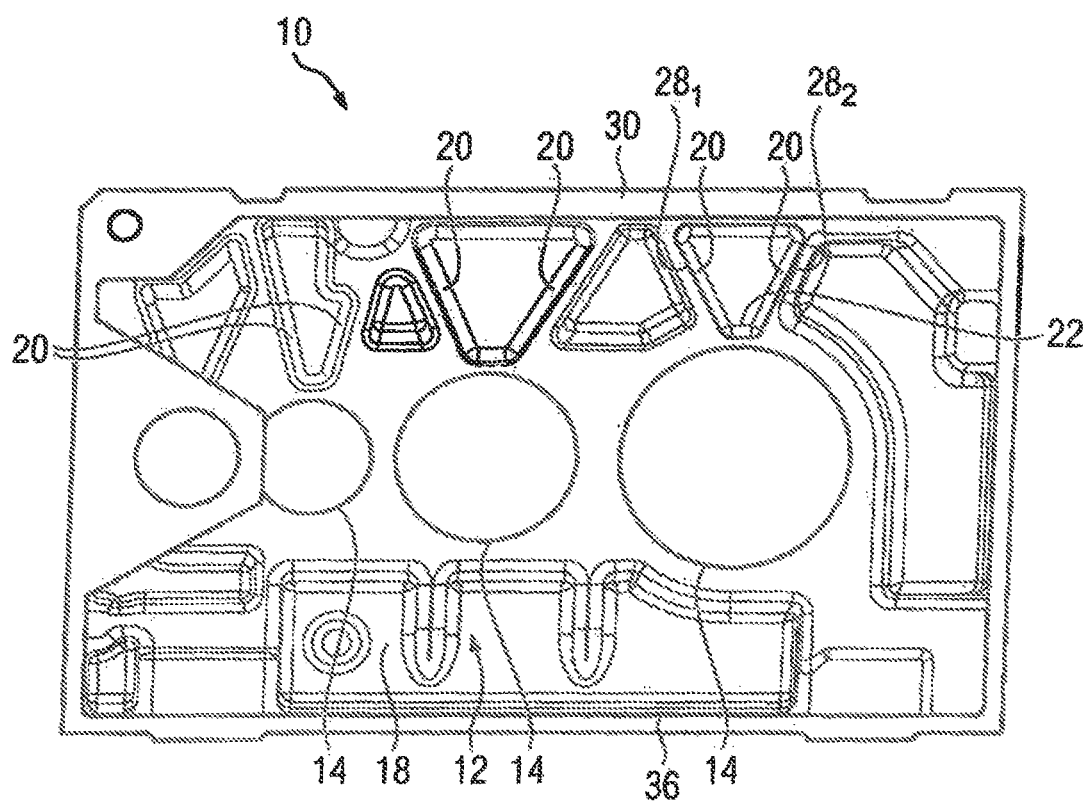
FIG. 1: shows a transmission housing in a vertical section.

FIG. 1 shows a transmission housing 10 in a vertical section. An inner side 18 of a side wall 12 of the transmission housing 10 is illustrated. A further side wall is provided on the side situated horizontally and which cannot be seen because of the section. In addition, the transmission housing 10 comprises a base 36 and a cover in the form of a disassemblable mounting cover 30. A plurality of round housing openings 14 for accommodating bearings not illustrated in FIG. 1 are provided in the side wall 12. In a ready-for-use state, a bevel spur gear or a spur gear with its corresponding individual parts can, for example, be accommodated in the transmission housing 10. Furthermore, accommodated in the transmission housing is a volume of lubricating oil via which lubrication of both the teeth which engage with one another during operation and of the bearings 16 (see FIG. 2) can be effected. The lubrication is effected by at least one of the revolving gear wheels dipping into the lubricating oil held in an oil sump below in the transmission housing 10, and the lubricating oil being transferred via them to the meshing partner or partners. By virtue of the rotation of the gear wheels, the lubricating oil is thrown off by the latter such that it is deposited as splash oil on the inner walls of the transmission housing 10 and flows down into the oil sump due to gravity.

It can be seen in FIG. 1 that the inner side 18 of the side wall 12 has a structure configured as a multiple rib structure 20. The rib structure 20 is formed by a protrusion rising from a main surface. In a most simple embodiment, just one rib structure 20 which is in turn formed by two ribs $28_1$, $28_2$ which taper vertically downward toward each other is formed on an inner side 18 of the side wall 12. The rib structure 20 which tapers in a funnel shape converges vertically downward in an approximate V shape, wherein the ribs $28_1$, $28_2$ do not necessarily have to meet in a tip below. A short horizontal connecting region can also be provided between the ribs $28_1$, $28_2$. In all conceivable embodiments, the rib structure 20 which tapers in a funnel shape opens out in a collecting pan 22. The collecting pan 22 serves to catch oil. In particular, oil which, coming from above, flows down the side wall 12 inside the rib structure 20 collects in the collecting pan 22. The rib structure 20 and the collecting pan 22 are positioned essentially centrally above the housing opening 14 of the side wall 12.

Figure 2:
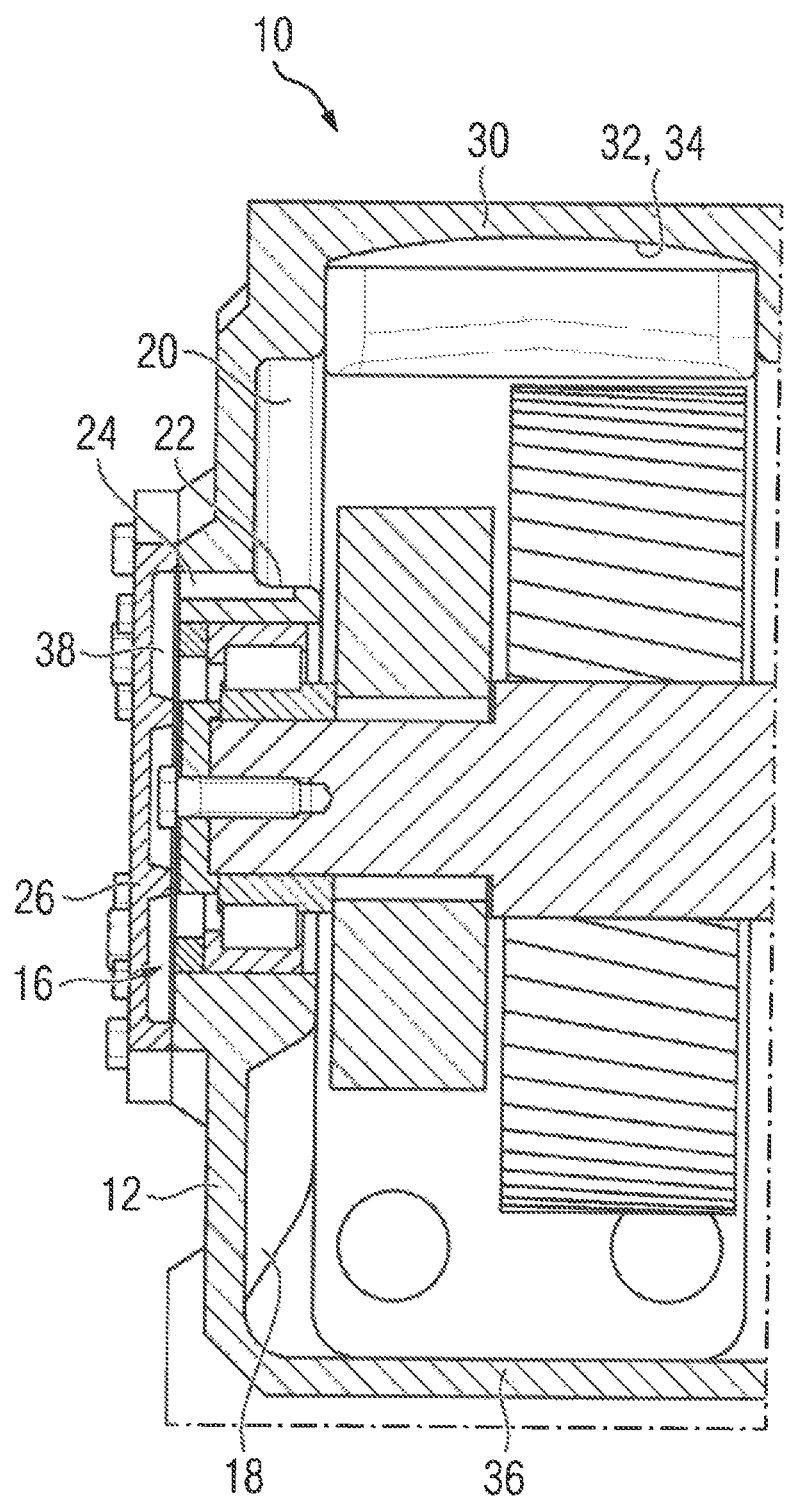
FIG. 2: shows a further vertical section of the transmission housing according to FIG. 1.

FIG. 2 shows a vertical section, rotated by 90° compared with FIG. 1, through the transmission housing 10, wherein the side wall on the right in the view is not Illustrated. The left-hand side wall 12 with a bearing 16 accommodated in the housing opening 14 can be seen. The bearing 16 comprises in the present case a taper roller bearing, wherein this will not be described in detail. Other types of bearing can also be provided. The housing opening 14 is closed with a housing side cover 26, wherein the housing side cover 26 can be retained with respect to the side wall 18, for example, via a large number of screw connections. A supplementary volume 38 is formed inside the housing side cover 26 with respect to the side wall 12 and the supplementary volume 38 is open with respect to the bearing 16 seated in the housing opening 14. The vertical section of FIG. 2 is made such that it extends centrally through the rib structure 20 lying above the housing opening 14 and through the collecting pan 22. A drill hole 24, which traverses the side wall 12 and forms the collecting pan 22 in the lower region of the rib structure 20, can also be seen. The drill hole 24 is open on the outer side of the side wall 12, inside the supplementary volume 38 enclosed by the housing side cover 26. The collecting pan 22 formed by the drill hole 24 in the interior of the transmission housing 10 is connected, so that it communicates with the supplementary volume 38, via the continuation of the drill hole 24 inside the side wall 12. Lubricating oll which is caught in the collecting pan 22 can consequently pass into the supplementary volume 38 via the continuation of the drill hole 24 in the side wall 12. The lubricating oil can pass from the supplementary volume 38 into and through the bearing 16.

The mounting cover 30 of the transmission housing 10 is shaped in such a way that an inner wall 32 of the mounting cover 30 is bulged outward starting from an internal volume of the transmission housing 10. The bulge 34 of the inner wall 32 here extends within a vertical plane of section extending perpendicular to the side wall 12, such as that made in FIG. 2.

Figure 3:
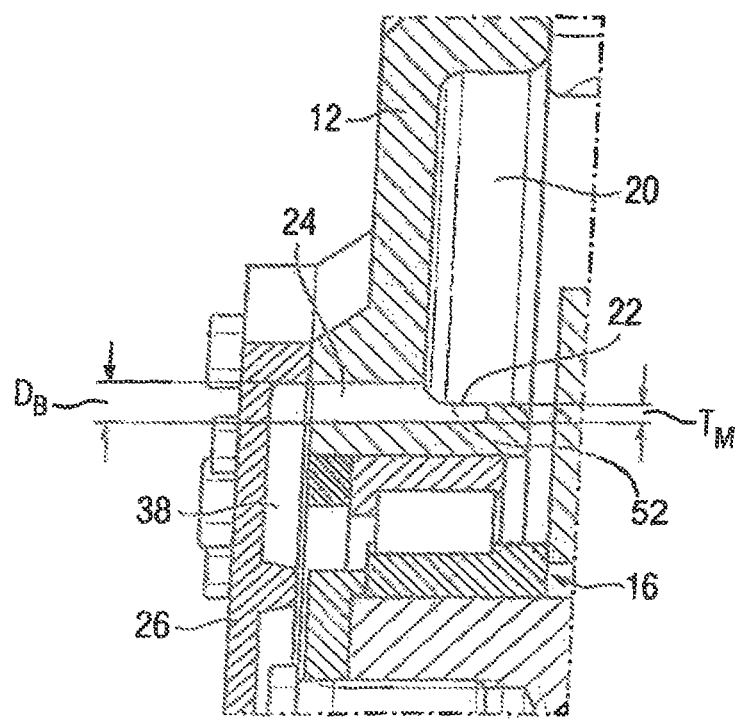
FIG. 3: shows a detail of a rib structure of the transmission housing according to FIG. 1.

FIG. 3 shows a detail of the rib structure 20 and the drill hole 24 which traverses the side wall 12 and forms the collecting pan 22 on the inside. The drill hole 24 passes through the side wall 12 in a horizontal direction. This is simple to implement in terms of manufacturing technology because the vast majority of the machining steps are performed on the transmission housing 12 anyway in mutually orthogonal directions. The collecting pan 22 has an undercut, indicated with the reference numeral 52 in FIG. 2, considered from a direction perpendicular to the side wall 12. This undercut 52 is, however, not the result of the casting process in which, for example, a corresponding casting core has been used and instead is the result of the drilling of the drill hole 24 which has taken place from outside to in through the side wall 12 and in which the lower region of the rib structure 20 has not been drilled all the way through. The diameter of the bore 24 is labeled DB in FIG. 3. Similarly, a vertical depth of the collecting pan 33 is labeled TM. The vertical depth TM of the collecting pan 22 extends from a base of the collecting pan 22 to the height of the undercut rib structure 20. In the present case, the ratio of the diameter DB of the bore 24 to the depth TM of the collecting pan 22 has been implemented such that the depth TM corresponds to essentially half the diameter DB. It has already been described above that this ratio can also be implemented in a different manner when this is expedient for an application.

Figure 4:
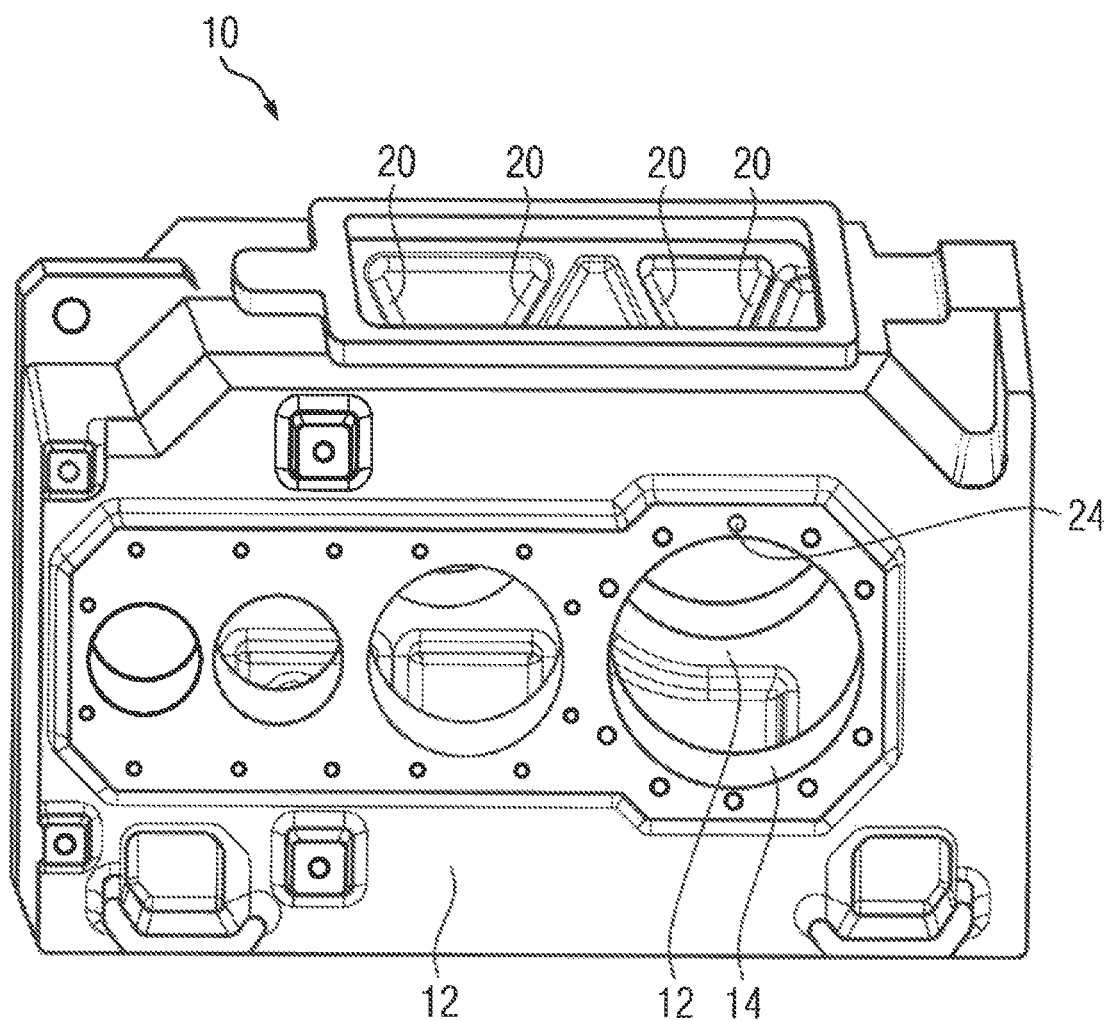
FIG. 4: shows a perspective view of the transmission housing according to FIG. 1.

A transmission housing 10 is shown in FIG. 4 in a perspective view. The housing side cover 26 on the front and the mounting cover 30 are hidden. Visible above the right-hand housing opening 14 is the drill hole 24 which forms the collecting pan 22 on the inner side of the side wall 12, in the foot region of the rib structure 20.

Figure 5:
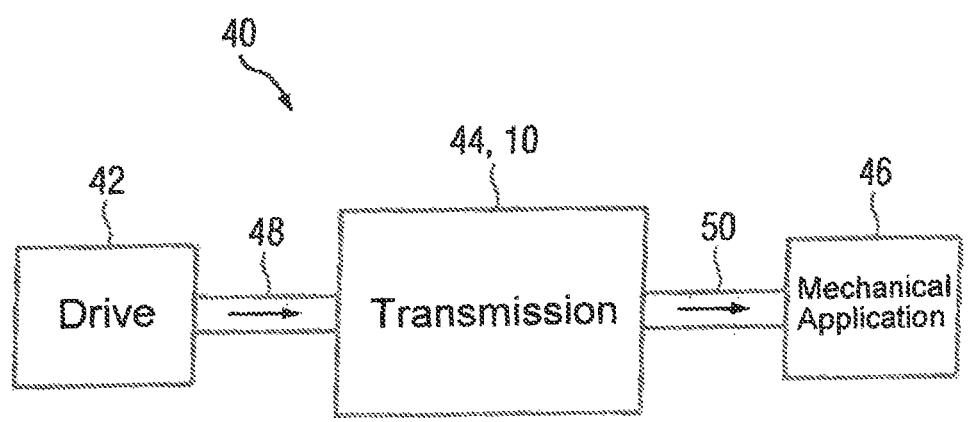
FIG. 5: shows an illustration of the concept of an industrial application.

An embodiment of an industrial application 40 is illustrated in FIG. 5. The industrial application 40 comprises a drive means 42 which is designed, for example, as an electric motor, an internal combustion engine, or a hydraulic motor. The drive means 42 is coupled in a torque-transmitting fashion to a transmission 44 which is in turn connected to a mechanical application 46. The drive means 42 is designed to output drive power which is supplied to the transmission 44 via a power shaft 48. The incoming drive power is converted by the transmission 44, taking into account friction losses, in terms of speed and torque and is passed as output power via a power shaft 50 to the mechanical application 46.

What is claimed is:

1. A transmission housing, comprising:
   a plurality of side walls, at least one of the side walls including one or more housing openings for accommodating a bearing; and
   a rib structure formed by at least two ribs which taper vertically downward toward each other on an inner side of one of the side walls vertically above one of the housing openings toward the one of the housing openings and terminating in a collecting pan formed by a drill hole extending through the one of the side walls, with the drill hole forming the collecting pan in cooperation with a portion located on the inner side of the one of the side walls.

2. The transmission housing of claim 1, further comprising a mounting cover including an inner wall which has a bulge bulged outward starting from an internal volume of the transmission housing.

3. The transmission housing of claim 2, wherein the bulge of the inner wall extends within a vertical plane of section extending perpendicular to the one of the side walls.

4. The transmission housing of claim 1, wherein two of the plurality of side walls situated horizontally opposite each other each include a rib structure above corresponding ones of the housing openings which taper toward the corresponding one of the housing openings.

5. The transmission housing of claim 1, wherein the collecting pan is delimited at least partially by the rib structure not included by the drill hole.

6. The transmission housing of claim 1, wherein the drill hole traverses the one of the side walls in a direction perpendicular to a main plane of the one of the side walls.

7. The transmission housing of claim 1, wherein the collecting pan includes an undercut as viewed from a direction perpendicular to the one of the side walls, said undercut being formed by a part of the rib structure not included by the drill hole.

8. The transmission housing of claim 1, wherein the collecting pan has a vertical depth between $\frac{1}{3}$ and $\frac{2}{3}$ of a diameter of the drill hole.

9. The transmission housing of claim 1, wherein the collecting pan has a vertical depth between $\frac{2}{5}$ and $\frac{3}{5}$ of a diameter of the drill hole.

10. The transmission housing of claim 1, wherein the collecting pan has a vertical depth which is ½ of a diameter of the drill hole.

11. The transmission housing of claim 1, further comprising a housing side cover designed to cover the at least one of the housing openings and the drill hole.

12. An industrial application, comprising:
a transmission coupled in a torque-transmitting fashion to a mechanical application and including a transmission housing which comprises a plurality of side walls, with at least one of the side walls including one or more housing openings for accommodating a bearing, a rib structure formed by at least two ribs which taper vertically downward toward each other on an inner side of one of the side walls vertically above one of the housing openings toward the one of the housing openings, and terminating in a collecting pan formed by a drill hole extending through the one of the side walls, with the drill hole forming the collecting pan in cooperation with a portion located on the inner side of the one of the side walls.

13. A method for producing a transmission housing, the method comprising:
casting a rib structure with no undercuts on an inner side of a side wall as viewed from a direction perpendicular to the side wall such that the rib structure tapers vertically above a housing opening of the side wall in a direction of the housing opening; and
drilling a drill hole in the side wall in a vertically lower region of the rib structure to form a collecting pan.

14. The method of claim 13, wherein the drill hole is drilled inward from an outer side of the side wall, with a center of the drill hole lying at a vertical height of a foot of the rib structure.

15. The method of claim 13, further comprising providing the collecting pan with an undercut as viewed from a direction perpendicular to the side wall such that the undercut is formed by a part of the rib structure not included by the drill hole.

16. The method of claim 13, further comprising covering the housing opening and the drill hole with a housing side cover.

17. The method of claim 13, forming the rib structure by at least two ribs which taper vertically downward toward each other.

18. The method of claim 13, further comprising a mounting cover including an inner wall which has a bulge bulged outward starting from an internal volume of the method.

* * * * *